United States Patent
Millner et al.

(10) Patent No.: US 8,597,400 B2
(45) Date of Patent: Dec. 3, 2013

(54) METHOD AND APPARATUS FOR SEPARATING A GASEOUS COMPONENT

(75) Inventors: Robert Millner, Loosdorf (AT); Norbert Rein, Vienna (AT); Gerald Rosenfellner, Ertl (AT)

(73) Assignee: Siemens Vai Metals Technologies GmbH, Linz (AT)

( * ) Notice: Subject to any disclaimer, the term of this patent is extended or adjusted under 35 U.S.C. 154(b) by 241 days.

(21) Appl. No.: 13/202,653

(22) PCT Filed: Jan. 18, 2010

(86) PCT No.: PCT/EP2010/050511
§ 371 (c)(1),
(2), (4) Date: Oct. 25, 2011

(87) PCT Pub. No.: WO2010/094527
PCT Pub. Date: Aug. 26, 2010

(65) Prior Publication Data
US 2012/0036997 A1    Feb. 16, 2012

(30) Foreign Application Priority Data

Feb. 20, 2009    (AT) .................................. A 282/2009

(51) Int. Cl.
*B01D 53/047* (2006.01)
*B01D 53/30* (2006.01)

(52) U.S. Cl.
USPC .......... 95/22; 95/96; 95/103; 95/139; 96/114; 266/144

(58) Field of Classification Search
USPC .................. 95/19, 22, 96, 103, 117, 139, 148; 96/113, 114, 121; 266/144
See application file for complete search history.

(56) References Cited

U.S. PATENT DOCUMENTS

| | | | |
|---|---|---|---|
| 4,331,456 A * | 5/1982 | Schwartz et al. | ................. 95/93 |
| 5,985,008 A | 11/1999 | Tom et al. | ....................... 96/143 |
| 6,235,081 B1 | 5/2001 | Wurm | .............................. 75/446 |

(Continued)

FOREIGN PATENT DOCUMENTS

| | | | |
|---|---|---|---|
| DE | 102005010050 A1 | 9/2006 | .............. C21B 13/00 |
| DE | 102008012735 A1 | 9/2009 | ............... C10K 1/20 |

(Continued)

OTHER PUBLICATIONS

International PCT Search Report and Written Opinion, PCT/EP2010/050511, 15 pages, Jun. 14, 2011.

*Primary Examiner* — Frank Lawrence, Jr.
(74) *Attorney, Agent, or Firm* — King & Spalding L.L.P.

(57) ABSTRACT

In a method and an apparatus for separating at least one gaseous component from a waste gas of an installation for producing liquid pig iron, liquid primary steel products or sponge iron, in a first step, a stream of the waste gas passes through at least one adsorption separator at a first pressure, whereby the gaseous component is largely separated from the waste gas and, in a second step, the gaseous component is largely removed from the adsorption separator at a second pressure, which is lower than the first pressure. The method and apparatus are maintenance-free, cause low investment and energy costs and has a lower space requirement by a method in which the second pressure or the desorption pressure is generated by at least one jet pump, which is fed a stream of a propellant gas at a third pressure, which is higher than the second pressure.

20 Claims, 4 Drawing Sheets

(56) References Cited

U.S. PATENT DOCUMENTS

| | | |
|---|---|---|
| 6,264,724 B1 | 7/2001 | Rosenfellnew et al. ........ 75/500 |
| 6,322,612 B1 | 11/2001 | Sircar et al. ........................ 95/97 |
| 6,740,258 B1 | 5/2004 | Wyschofsky et al. ......... 252/373 |
| 7,951,225 B2 * | 5/2011 | Olander et al. ................. 95/136 |
| 2003/0047037 A1 | 3/2003 | Sethna et al. ................... 75/505 |
| 2011/0061529 A1 | 3/2011 | Von Trotha et al. .............. 95/99 |

FOREIGN PATENT DOCUMENTS

| | | | |
|---|---|---|---|
| EP | 0864350 A2 | 9/1998 | ........... B01D 53/047 |
| EP | 1101731 A1 | 5/2001 | ................ C01B 3/38 |
| EP | 1142623 | 10/2001 | ........... B01D 53/047 |
| GB | 1599163 | 9/1981 | .............. C21B 13/00 |
| WO | 97/33005 | 9/1997 | .............. C21B 13/14 |
| WO | 97/33033 | 9/1997 | .............. C21B 13/14 |

* cited by examiner

METHOD AND APPARATUS FOR SEPARATING A GASEOUS COMPONENT

CROSS-REFERENCE TO RELATED APPLICATIONS

This application is a U.S. National Stage Application of International Application No. PCT/EP2010/050511 filed Jan. 18, 2010, which designates the United States of America, and claims priority to Austrian Patent No. A282/2009 filed Feb. 20, 2009, the contents of which are hereby incorporated by reference in their entirety.

TECHNICAL FIELD

The present invention relates to a method and an apparatus for separating at least one gaseous component from a waste gas of an installation for producing liquid pig iron, liquid primary steel products or sponge iron.

In actual fact, the invention relates to a method for separating at least one gaseous component from a waste gas of an installation for producing liquid pig iron, liquid primary steel products or sponge iron, wherein, in a first step, a stream of the waste gas passes through at least one adsorption separator at a first pressure, whereby the gaseous component is largely separated from the waste gas and, in a second step, the gaseous component is largely removed from the adsorption separator at a second pressure, which is lower than the first pressure.

BACKGROUND

An apparatus for implementing this method has at least one adsorption separator and at least one device for generating a desorption pressure.

AT 41796 A discloses an apparatus for separating carbon dioxide from a waste gas of an installation for producing sponge iron which has an adsorption separator and a device for generating a desorption pressure, wherein the device for generating the desorption pressure is configured as a compressor.

The use of a compressor for generating a desorption pressure that is as low as possible is not advantageous, because the compressor is not maintenance-free, causes high investment and energy costs, has a great space requirement and also causes a high level of disruptive noise.

SUMMARY

According to various embodiments, a method and an apparatus for separating at least one gaseous component from a waste gas of an installation for producing liquid pig iron, liquid primary steel products or sponge iron can be provided that is maintenance-free, causes low investment and energy costs and has a lower space requirement.

According to an embodiment, in a method for separating at least one gaseous component from a waste gas of an installation for producing liquid pig iron, liquid primary steel products or sponge iron, in a first step, a stream of the waste gas passes through at least one adsorption separator at a first pressure, whereby the gaseous component is largely separated from the waste gas and, in a second step, the gaseous component is largely removed from the adsorption separator at a second pressure, which is lower than the first pressure, wherein the second pressure is generated by at least one jet pump, which is fed a stream of a propellant gas at a third pressure, which is higher than the second pressure.

According to a further embodiment, either a top gas, an offgas, a surplus gas or a mixture of at least two of these gases can be used as the propellant gas. According to a further embodiment, either a top gas, an offgas, a surplus gas or a mixture of at least two of these gases can be used as the waste gas. According to a further embodiment, either carbon dioxide and/or water vapor can be separated from the waste gas. According to a further embodiment, an adsorption agent of zeolite, activated silica, silica gel, activated alumina, activated charcoal or a mixture of at least two of these substances can be used in the adsorption separator. According to a further embodiment, the propellant gas can be fed to the jet pump at a pressure of 0.5 to 5 bar above ambient pressure. According to a further embodiment, the propellant gas can be fed to a number of jet pumps, set up in a series arrangement, whereby the gaseous component is removed from the adsorption separator at a reduced second pressure. According to a further embodiment, the propellant gas can be fed to a number of jet pumps set up in a parallel arrangement, whereby the gaseous component is removed from the adsorption separator at a reduced second pressure. According to a further embodiment, the first pressure can be applied to the adsorption separator in an adsorption phase, the pressure in the adsorption separator is lowered from the first pressure to the second pressure, or to a pressure which lies somewhat above the second pressure, with one or more intermediate pressures, the second pressure is applied to the adsorption separator in a desorption phase and subsequently the pressure in the adsorption separator is increased from the second pressure to the first pressure with one or more intermediate pressures. According to a further embodiment, the pressure in the adsorption separator can be changed continuously or discretely. According to a further embodiment, the second pressure can be detected by means of a measuring device and fed to a controller, with the aid of a set of rules, and with allowance for a setpoint value, the controller determines a manipulated variable and feeds it to a control element, wherein the stream of propellant gas to the jet pump is changed in such a way that the pressure corresponds as far as possible to the setpoint value.

According to another embodiments, an apparatus for separating at least one gaseous component from a waste gas of an installation for producing liquid pig iron, liquid primary steel products or sponge iron, may have at least one adsorption separator and at least one device for generating a desorption pressure, wherein the device for generating the desorption pressure is configured as a jet pump with a connecting line between a desorption connection of the adsorption separator and a suction connection of the jet pump.

According to a further embodiment of the apparatus, a propellant gas connection of the jet pump can be connected to a line for a top gas, an offgas, a surplus gas or a mixture of at least two of these gases of the installation for producing liquid pig iron, liquid primary steel products or sponge iron. According to a further embodiment of the apparatus, a number of jet pumps can be set up in a series arrangement, a pressure connection of an upstream jet pump is respectively connected to a suction connection of a downstream jet pump and all the propellant gas connections are connected to a line for a top gas, an offgas, a surplus gas or a mixture of at least two of these gases of the installation for producing liquid pig iron, liquid primary steel products or sponge iron. According to a further embodiment of the apparatus, a number of jet pumps can be set up in a parallel arrangement, all the suction connections are connected to the desorption connection of the adsorption separator and all the propellant gas connections are connected to a line for a top gas, an offgas, a surplus gas or a mixture of at least two of these gases of the installation for producing liquid pig iron, liquid primary steel products or sponge iron. According to a further embodiment of the apparatus, the apparatus may have a combination of series and parallel arrangements of jet pumps. According to a further embodiment of the apparatus, the apparatus additionally may have a measuring device for detecting a desorption pressure, a control device and a control element in a propellant gas line of the jet pump.

BRIEF DESCRIPTION OF THE DRAWINGS

Further advantages and features emerge from the following description of non-restrictive exemplary embodiments, with reference being made to the following figures, in which.

DETAILED DESCRIPTION

According to various embodiments, in a method the second pressure or the desorption pressure is generated by at least one jet pump, which is fed a stream of a propellant gas at a third pressure, which is higher than the second pressure.

When separating at least one gaseous component, for example carbon dioxide ($CO_2$) and/or water vapor ($H_2O$), from a waste gas of an installation for producing liquid pig iron, liquid primary steel products or sponge iron, the prior art provides, inter alia, that pressure swing adsorption systems (PSA Pressure Swing Adsorption or VPSA Vacuum Pressure Swing Adsorption) are used. The waste gas is made up of top gas, offgas, surplus gas or any desired mixture of these gases. The used reducing gas from a blast furnace or a reduction shaft is referred to as top gas. The used reducing gas from one or more fluidized bed reactors is referred to as offgas. The control gas from a melt gasifier required for control is referred to as surplus gas. In a first step, known as the adsorption phase, the waste gas passes through at least one adsorption separator at a first pressure $p_1$, known as the adsorption pressure, whereby the gaseous component is largely separated from the waste gas. In this case, the separation takes place all the better the higher the first pressure can be set. Since the take-up capacity of the adsorption agents contained in the adsorption separator is limited, it is necessary to remove the gaseous component from the adsorption separator in a second step, known as the desorption phase, at a second pressure $p_2$, known as the desorption pressure, which is lower than the first pressure. The removal of the gaseous component from the adsorption separator works all the better the lower the second pressure can be set. By the method according to various embodiments, the second pressure is generated by at least one jet pump, wherein a propellant gas connection of the jet pump is fed a stream of a propellant gas at a third pressure $p_3$, which is higher than the second pressure. A suction connection of the jet pump is connected by means of a connecting line to a desorption connection of the adsorption separator; the gas which is removed from one or more adsorption separators in a desorption phase is referred to as tail gas. A person skilled in the art is familiar with jet pumps, often also known as ejectors, injectors or venturi nozzles (cf., for example, http://en.wikipedia.org/wiki/Jet_pump). The use of a jet pump rather than a compressor for generating the desorption pressure has the following advantages: lower procurement and energy costs, lower space requirement and freedom from maintenance of the jet pump.

An embodiment is to use either a top gas, an offgas, a surplus gas or a mixture of at least two of these gases as the propellant gas for the jet pump. Since these gases typically have a pressure level of 0.5 to 5 bar and, according to the prior art, this pressure must in any case be throttled, it is advantageous to use the compressive energy present in the propellant gas for generating the desorption pressure, whereby much lower operating and investment costs are obtained—by comparison with PSA systems with compressors.

In one embodiment, a top gas, an offgas, a surplus gas or a mixture of at least two of these gases is used as the waste gas. It is advantageous to separate from the waste gas either carbon dioxide ($CO_2$) and/or water vapor ($H_2O$), whereby either the reduction potential and/or the calorific value of the waste gas is increased. In the case of direct reduction installations, the increase in the reduction potential of the waste gas is relevant, in the case of blast furnaces the increase in the reduction potential is likewise relevant and so too is the increase in the calorific value of the waste gas.

For the separation of carbon dioxide and/or water vapor, it is advantageous to use an adsorption agent of zeolite, activated silica, silica gel, activated alumina, activated charcoal or a mixture of at least two of these substances in the adsorption vessel.

The compressive energy present in the propellant gas can be used directly for the desorption of the adsorption separator if the propellant gas is fed to the jet pump at a pressure of 0.5 to 5 bar above ambient pressure. As a result, no adaptation of the pressure level of the propellant gas ($p_3$) to the desorption pressure ($p_2$) is required; the setting of the desorption pressure takes place either by way of the flow rate of the propellant gas, by way of the area ratio of the jet pump or by way of the design and arrangement of one or more jet pumps (for example in series).

A particularly low desorption pressure, and consequently a particularly thorough desorption, of the adsorption separator and thereby low residual burden of gas components to be removed (for example $CO_2$ and/or $H_2O$), can be achieved if the propellant gas is fed to a number of jet pumps, set up in a series arrangement, whereby the gaseous component is removed from the adsorption separator at a reduced second pressure.

In a further variant it is possible to feed the propellant gas to a number of jet pumps set up in a parallel arrangement, whereby the gaseous component is removed from the adsorption separator at a reduced second pressure. By this arrangement of jet pumps, it is possible to use a number of smaller jet pumps instead of one large jet pump.

For the operation of the pressure swing adsorption system, it is advantageous to apply the first pressure to the adsorption separator in an adsorption phase, to lower the pressure in the adsorption separator from the first pressure to the second pressure, or to a pressure which lies somewhat above the second pressure, in a first transitional phase with one or more intermediate pressures, to apply the second pressure to the adsorption separator in a desorption phase and subsequently to increase the pressure in the adsorption separator from the second pressure to the first pressure in a second transitional phase with one or more intermediate pressures. This avoids rapid changes in pressure, which has a positive effect on the separating efficiency, since fewer gas components comprising carbon monoxide (CO) and hydrogen ($H_2$) are lost into the tail gas and, furthermore, the pressure loading on the adsorption separator and the pressure swing loading on the distributor bases and generation of noise are reduced.

It is particularly favorable to change the desorption pressure in the adsorption separator continuously. Alternatively, the pressure may also be changed discretely, for example in stages, for example by controlling the supply of propellant gas to jet pumps.

The pressure can be set particularly accurately if the second pressure or the desorption pressure is detected by means of a measuring device and fed to a controller, with the aid of a set of rules, and with allowance for a setpoint value, the controller determines a manipulated variable and feeds it to a control element, wherein the stream of propellant gas to the jet pump is changed in such a way that the pressure corresponds as far as possible to the setpoint value for the desorption pressure.

In order to make it possible to implement the method according to various embodiments as directly as possible in such a way as to achieve the object underlying the invention, it is advantageous that the device for generating a desorption pressure is configured as a jet pump with a connecting line between a desorption connection of the adsorption separator and a suction connection of the jet pump.

In an embodiment, a propellant gas connection of the jet pump is connected to a line for a top gas, an offgas, a surplus gas or a mixture of at least two of these gases of the installation for producing liquid pig iron, liquid primary steel products or sponge iron.

A particularly low desorption pressure, and consequently particularly thorough desorption of the adsorption separator, can be achieved if a number of jet pumps are set up in a series arrangement, a suction connection of a first jet pump is connected to the desorption connection of the absorption separator, a pressure connection of an upstream jet pump is respectively connected to a suction connection of a downstream jet pump and all the propellant gas connections are connected to a line for a top gas, an offgas, a surplus gas or a mixture of at least two of these gases of the installation for producing liquid pig iron, liquid primary steel products or sponge iron.

A further configurational variant is to set up a number of jet pumps in a parallel arrangement, to connect all the suction connections to the desorption connection of the adsorption separator and to connect all the propellant gas connections to a line for a top gas, an offgas, a surplus gas or a mixture of at least two of these gases of the installation for producing liquid pig iron, liquid primary steel products or sponge iron.

It is of course likewise possible for the apparatus to have a combination of series and parallel arrangements of jet pumps. In one possible embodiment, the propellant gas is fed to a number of jet pumps set up in a series arrangement, wherein each element of the series arrangement consists of a number of jet pumps set up in a parallel arrangement. In this case, the propellant gas fed to one element of the series arrangement is distributed to the jet pumps set up in a parallel arrangement. By the parallel arrangement of a number of jet pumps, the overall intake capacity is increased, whereby it becomes possible to use smaller jet pumps without having to match their size to a required overall intake capacity (scalability). By the series arrangement of a number of jet pumps, the achievable overall desorption pressure is reduced.

To be able to set the pressure in the adsorption separator particularly accurately in a transitional phase, it is advantageous that the apparatus additionally has a measuring device for detecting a desorption pressure, a control device and a control element in a propellant gas line of the jet pump.

In the following figures, the directions of flow are indicated by arrows.

Figure 1:
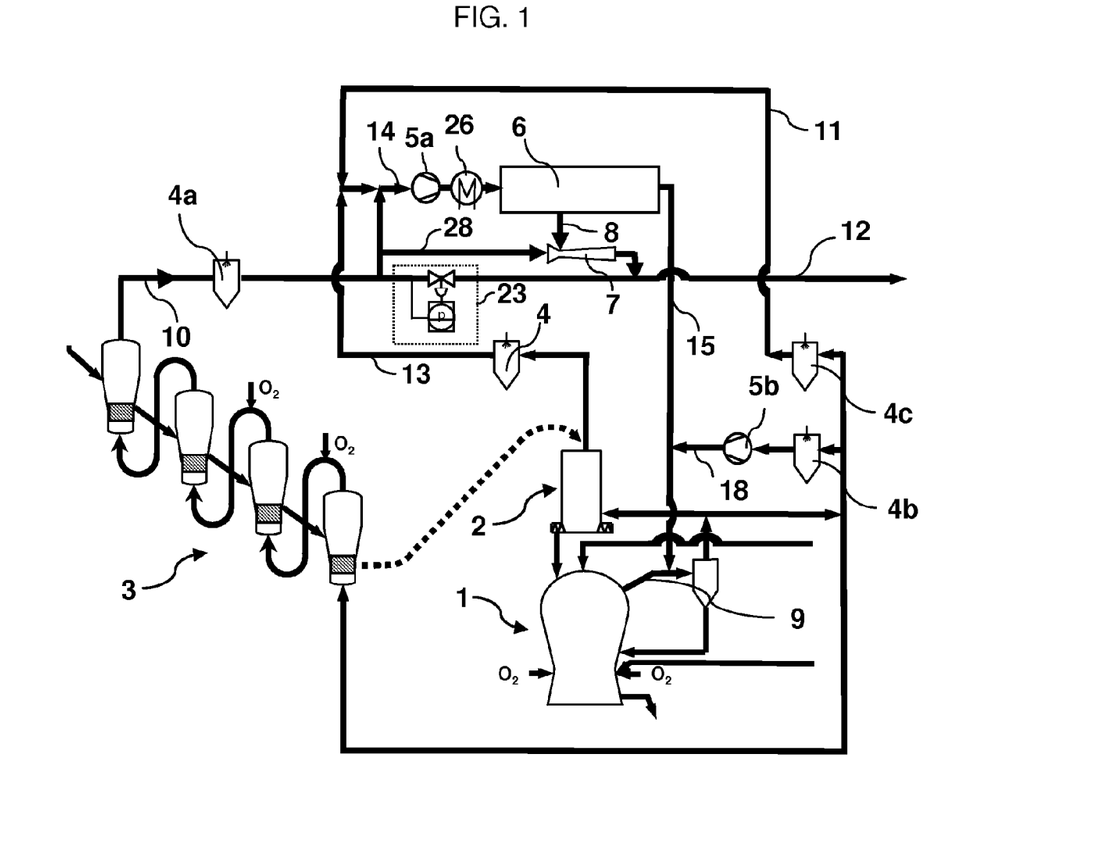
FIG. 1 shows a schematic representation of a smelting reduction installation on the basis of fine ore with a pressure swing adsorption system for separating $CO_2$ and $H_2O$.

In FIG. 1, a smelting reduction installation for producing liquid pig iron on the basis of fine ore is shown. Here a fine ore, possibly with additions, is pre-reduced in a cascade of multiple pre-reduction reactors 3 (four fluidized-bed reactors are shown, 2 and 3 are also optionally possible) and subsequently charged into a reduction reactor 2. In the reduction reactor 2, a further reduction takes place and a pre-heating of the charged materials. However, it is also possible to dispense with the further reduction in the reduction reactor 2, whereby the gas scrubber 4 and the line for a top gas 13 are omitted. The pre-reduction in the pre-reduction reactors 3 or a reduction in the reduction reactor 2 is performed by means of a reducing gas 9, which is produced in a melter gasifier 1 and, after dedusting, is passed into the reduction reactor 2 and successively through the individual pre-reduction reactors 3. An amount of gas in excess of this is either mixed with a cleaned waste gas 15 after gas scrubbing in a gas scrubber 4b and compression with a compressor 5b as cooling gas 18, or is used as surplus gas 11, once again after gas scrubbing in a gas scrubber 4c. To increase the energy efficiency of the overall process, the line for the cooling gas 18 with the gas scruber 4b and the compressor 5b may be omitted. An offgas 10 is drawn off in the direction of flow thereof from the last pre-reduction reactor 3 and cleaned in a gas scrubber 4a. The waste gas 14 of the smelting reduction installation consists of a first partial amount of offgas 10, which is branched off upstream of a pressure controller 23, of top gas 13 and of surplus gas 11. The pressure controller 23 has the task of keeping the pressure of the offgas 10 constant and controlling the initial pressure for the compressor 5a and the propellant gas; a second partial amount of the offgas 10 is fed to a jet pump 7 as propellant gas 28. The waste gas 14 is compressed by means of a compressor 5a, cooled by means of a gas cooler 26 and fed at a first pressure $p_1$ to at least one adsorption separator of a pressure swing adsorption system 6 for the separation of carbon dioxide ($CO_2$) and/or water vapor ($H_2O$). The waste gas 15 cleaned by the separation of $CO_2$ and/or $H_2O$ is subsequently mixed with the reducing gas 9 and used further in the process; it is immaterial here whether the cleaned waste gas 15 is added before or after the hot gas cyclone. In an embodiment that is not represented, the cleaned waste gas 15 or a partial amount thereof may be heated by a heating device. The flowing of the propellant gas through the jet pump 7 at a third pressure $p_3$ has the effect of generating a second pressure $p_2$ or a desorption pressure ($p_2 < p_3$ and $p_2 < p_1$), which is used for removing the separated carbon dioxide and/or the water vapor from the adsorption separator of the pressure swing adsorption system 6. For this purpose, a desorption connection of the adsorption separator is connected via a connecting line 8 for tail gas to a suction connection of the jet pump. In an embodiment that is not represented, a line with a shut-off element may be provided between the connecting line 8 and a line for the export gas in the region after the jet pump 7 and be shut off, for example, when the smelting reduction installation is started up, whereby a lower pressure of the export gas 12 is obtained during starting up; in normal operation, however, this line is shut off. Generating the desorption pressure by the propellant gas flowing through the jet pump 7 has the following advantages: freedom from maintenance of the jet pump, in particular no moving parts, lower space requirement and lower procurement costs compared with a compressor, and also no energy costs. A further advantage is that, in the case of an installation according to the prior art, the offgas or top gas or surplus gas must in any case be throttled to the ambient pressure. In the case of the method according to various embodiments, the compressive energy of the waste gas is used for generating the desorption pressure and is available as export gas 12.

Figure 2:
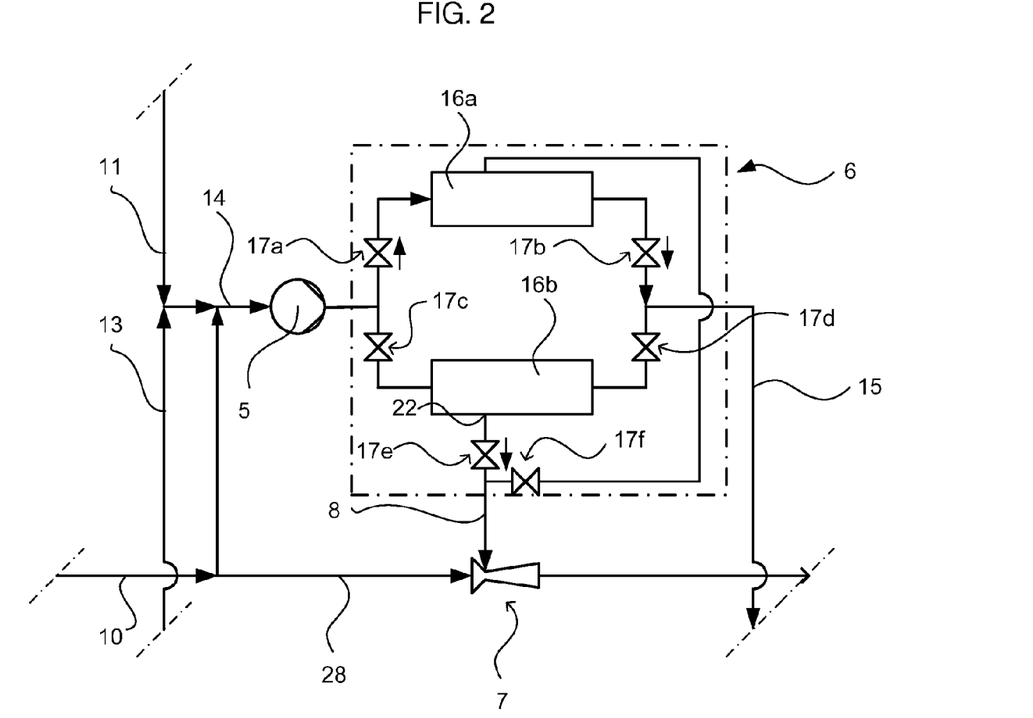
FIG. 2 shows a schematic representation of a pressure swing adsorption system for separating $CO_2$ and $H_2O$.

FIG. 2 shows an embodiment of the pressure swing adsorption system 6 with two adsorption separators 16a and 16b. As in FIG. 1, a waste gas 14 that is fed to the pressure swing adsorption system 6 is made up of a partial amount of offgas 10, surplus gas 11 and top gas 13. As drawn, the valves 17a and 17b are open and the valve 17f is closed, i.e. the adsorption separator 16a is in an adsorption phase and separates $CO_2$ and/or $H_2O$ from the compressed waste gas 14. A waste gas 15 cleaned in this way may—as drawn in FIG. 1—be mixed with a reducing gas or be used as reducing gas, possibly after heating up. The valves 17c and 17d are closed and the valve 17e is open, i.e. the adsorption separator 16b is in a desorption phase. The generation of the desorption pressure is performed by means of a jet pump 7, which is flowed through by a propellant gas 28 (a partial stream of the offgas 10). After flowing through the jet pump 7, the offgas and a tail gas obtained through a connecting line 8 are available as export gas. When the take-up capacity of an adsorption agent in the adsorption separator 16a is largely exhausted and/or the adsorption separator 16b has been largely desorbed, the valves 17a, 17b and 17e are closed and the valves 17c, 17d and 17f are opened. The opening and closing of the valves may be performed quickly and discretely, or else slowly and continuously. The switching of the valves has the effect that the adsorption separator 16a is brought into the desorption phase and the adsorption separator 16b is brought into the adsorption phase. In the drawing, interfaces with other parts of the installation are represented by dash-dotted lines.

Figure 3:
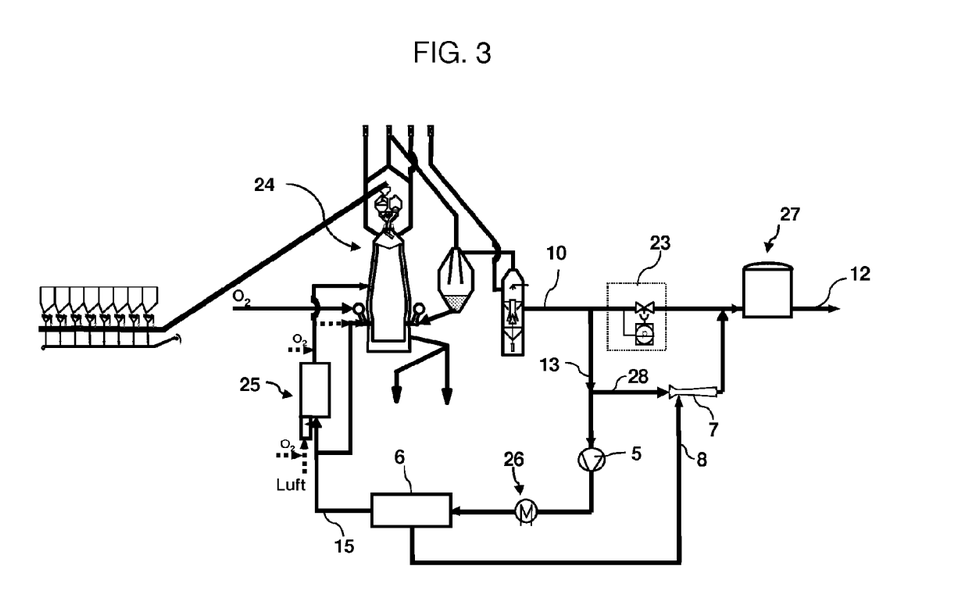
FIG. 3 shows a schematic representation of a blast furnace with a pressure swing adsorption system for separating $CO_2$ and $H_2O$.

FIG. 3 shows a representation of a blast furnace 24 for producing pig iron with a pressure swing adsorption system 6. The pig iron is produced in the blast furnace 24 with the addition of gas containing oxygen (preferably >80% $O_2$) and with the charging of coke and ore. A partial amount of a waste gas 10 of the blast furnace 24, known as top gas 13, is branched off upstream of a pressure controller 23 and, after an increase in the pressure by means of a compressor 5 and cooling in a gas cooler 26, is fed to the pressure swing absorption system 6 at a first pressure $p_1$. A partial amount of the top gas 13 is fed as propellant gas 28 to a jet pump 7 at a third pressure $p_3$, which generates the second pressure $p_2$ or the desorption pressure for the removal of $CO_2$ and/or $H_2O$ from an adsorption separator of the pressure swing absorption system 6. Here it is once again the case that $p_2<p_1$ and $p_2<p_3$. The pressure swing adsorption system 6 separates $CO_2$ and/or $H_2O$ from the waste gas, so that a cleaned waste gas 15 has a higher reduction potential and a higher calorific value. After optional pre-heating, this gas is fed to a reducing gas furnace 25 and the blast furnace 24, for example via the air-blast tuyeres or oxygen nozzles, or into the shaft of the blast furnace above a cohesive zone. An export gas 12, consisting of the propellant gas 28, the tail gas in the connecting line 8 and the remaining waste gas, is temporarily stored in a gas accumulator 27, from where it is passed on for thermal use. With respect to the details of the pressure swing adsorption system 6, reference is made to FIG. 2. Generating the desorption pressure by the propellant gas 28 flowing through the jet pump 7 once again has the following advantages: freedom from maintenance of the jet pump, in particular no moving parts, lower space requirement and lower procurement costs compared with a compressor, and also no energy costs.

Figure 4:
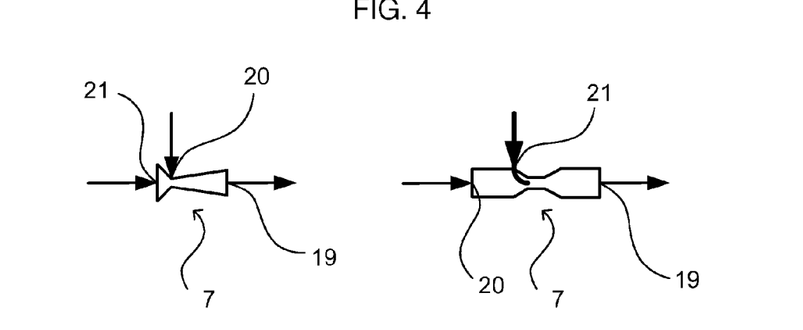
FIG. 4 shows two schematic representations of jet pumps.

FIG. 4 shows two schematic representations of jet pumps. The representation on the left shows a jet pump 7 where the propellant gas connection 21 and the pressure connection 19 lie in one axis. The suction connection 20 is arranged at right angles to the propellant gas connection/pressure connection axis. In the case of the representation on the right, the suction connection 20 and the pressure connection lie in one axis; the propellant gas connection 21 is arranged at right angles to this axis. It is the case for both representations that the suction connection 20 is in connection with the region of narrowest flow cross section of the jet pump and that a propellant gas is applied to the propellant gas connection 21 at a pressure $p_3$, thereby establishing in the suction connection 20a pressure $p_2$ for Which $p_2<p_3$.

Figure 5:
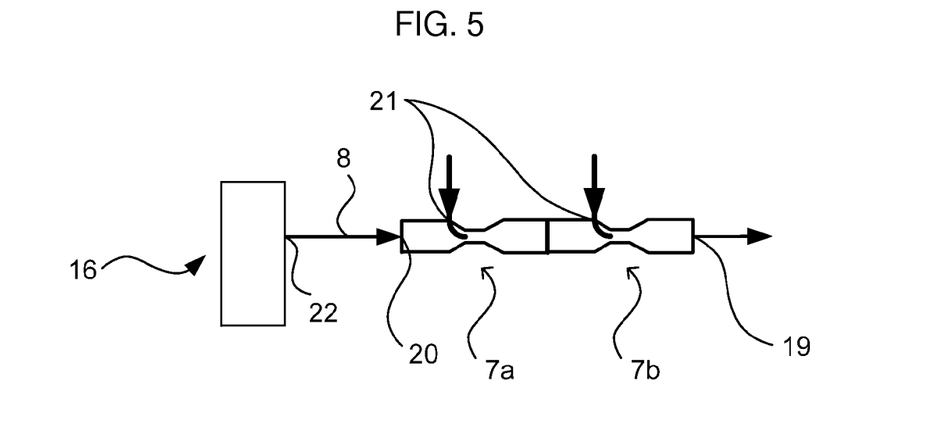
FIG. 5 shows a schematic representation of a series arrangement of jet pumps.

FIG. 5 shows a schematic representation of a series arrangement of two jet pumps 7a and 7b. A connecting line 8 for tail gas connects a suction connection 20 of the jet pump 7a to a desorption connection 22 of an adsorption separator 16. The pressure connection of the suction pump 7a is connected to the suction connection of the suction pump 7b, whereby a particularly low desorption pressure can be achieved. Both jet pumps 7a and 7b are supplied with propellant gas by means of a propellant gas connection 21.

Figure 6:
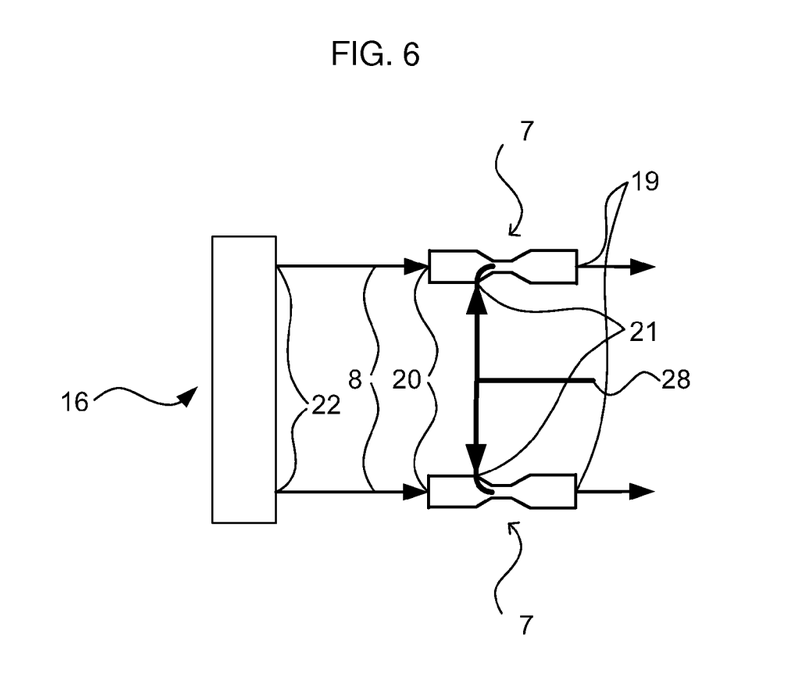
FIG. 6 shows a schematic representation of a parallel arrangement of jet pumps.

In FIG. 6, a schematic representation shows a parallel arrangement of two jet pumps 7. Two connecting lines 8 for tail gas respectively connect a suction connection 20 of the two jet pumps 7 to a desorption connection 22 of an adsorption separator 16. Both jet pumps 7 are supplied with propellant gas by means of the propellant gas connections 21 thereof, whereby the propellant gas 28 is distributed between two smaller suction pumps. Moreover, simpler setting (open-loop or closed-loop control) of the desorption pressure is possible by changing an amount of propellant gas.

The method according to the invention and the use of the apparatus according to the invention are not in any way restricted to FINEX® installations (FIG. 1) or blast furnaces (FIG. 3); rather, application in the case of natural-gas direct reduction installations (for example of the HYL® or FINMET® type), COREX® installations or else combined direct reduction installations is also advantageous.

LIST OF DESIGNATIONS

1 Melter gasifier
2 Reduction reactor
3 Cascade of pre-reduction reactors
4 Gas scrubber
5 Compressor
6 Pressure swing adsorption system
7 Jet pump
8 Connecting line
9 Reducing gas
10 Offgas
11 Surplus gas
12 Export gas
13 Top gas
14 Waste gas
15 Cleaned waste gas
16 Adsorption separator
17 Valve
18 Cooling gas
19 Pressure connection
20 Suction connection
21 Propellant gas connection
22 Desorption connection
23 Pressure controller
24 Blast furnace 25 Reducing gas furnace
26 Gas cooler
27 Gas accumulator
28 Propellant gas

What is claimed is:

1. A method for separating at least one gaseous component from a waste gas of an installation for producing liquid pig iron, liquid primary steel products or sponge iron, comprising:
   in a first step, passing a stream of the waste gas through at least one adsorption separator at a first pressure, whereby the gaseous component is largely separated from the waste gas and,
   in a second step, largely removing the gaseous component from the adsorption separator at a second pressure, which is lower than the first pressure, wherein the second pressure is generated by at least one jet pump, which is fed a stream of a propellant gas at a third pressure, which is higher than the second pressure,
   wherein either a top gas, an offgas, a surplus gas or a mixture of at least two of these gases is used as the propellant gas,
   wherein either a top gas, an offgas, a surplus gas or a mixture of at least two of these gases is used as the waste gas, and
   wherein the second pressure is detected by means of a measuring device and fed to a controller, with the aid of a set of rules, and with allowance for a setpoint value, the controller determines a manipulated variable and feeds it to a control element, wherein the stream of propellant gas to the jet pump is changed in such a way that the pressure corresponds as far as possible to the setpoint value.

2. The method according to claim 1, wherein at least one of carbon dioxide and water vapor is separated from the waste gas.

3. The method according to claim 1, wherein an adsorption agent of zeolite, activated silica, silica gel, activated alumina, activated charcoal or a mixture of at least two of these substances is used in the adsorption separator.

4. The method according to claim 1, wherein the propellant gas is fed to the jet pump at a pressure of 0.5 to 5 bar above ambient pressure.

5. The method according to claim 1, wherein the propellant gas is fed to a number of jet pumps, set up in a series arrangement, whereby the gaseous component is removed from the adsorption separator at a reduced second pressure.

6. The method according to claim 1, wherein the propellant gas is fed to a number of jet pumps set up in a parallel arrangement, whereby the gaseous component is removed from the adsorption separator at a reduced second pressure.

7. The method according to claim 1, wherein the first pressure is applied to the adsorption separator in an adsorption phase, the pressure in the adsorption separator is lowered from the first pressure to the second pressure, or to a pressure which lies somewhat above the second pressure, with one or more intermediate pressures, the second pressure is applied to the adsorption separator in a desorption phase and subsequently the pressure in the adsorption separator is increased from the second pressure to the first pressure with one or more intermediate pressures.

8. The method according to claim 7, wherein the pressure in the adsorption separator is changed continuously or discretely.

9. An apparatus for separating at least one gaseous component from a waste gas of an installation for producing liquid pig iron, liquid primary steel products or sponge iron, comprising at least one adsorption separator and at least one device for generating a desorption pressure, wherein the device for generating the desorption pressure is configured as a jet pump with a connecting line between a desorption connection of the adsorption separator and a suction connection of the jet pump,
   wherein a propellant gas connection of the jet pump is connected to a line for a top gas, an offgas, a surplus gas or a mixture of at least two of these gases of the installation for producing liquid pig iron, liquid primary steel products or sponge iron,
   wherein the adsorption separator is connected to a waste gas line of the installation for producing liquid pig iron, liquid primary steel products or sponge iron; and
   wherein the apparatus additionally has a measuring device for detecting a desorption pressure, a control device and a control element in a propellant gas line of the jet pump.

10. The apparatus according to claim 9, wherein a number of jet pumps are set up in a series arrangement, a pressure connection of an upstream jet pump is respectively connected to a suction connection of a downstream jet pump and all the propellant gas connections are connected to a line for a top gas, an offgas, a surplus gas or a mixture of at least two of these gases of the installation for producing liquid pig iron, liquid primary steel products or sponge iron.

11. The apparatus according to claim 9, wherein a number of jet pumps are set up in a parallel arrangement, all the suction connections are connected to the desorption connection of the adsorption separator and all the propellant gas connections are connected to a line for
   a top gas, an offgas, a surplus gas or a mixture of at least two of these gases of the installation for producing liquid pig iron, liquid primary steel products or sponge iron.

12. The apparatus according to claim 10, wherein the apparatus has a combination of series and parallel arrangements of jet pumps.

13. A system for separating at least one gaseous component from a waste gas of an installation for producing liquid pig iron, liquid primary steel products or sponge iron, comprising:
   an adsorption separator through which a stream of the waste gas passes at a first pressure, whereby the gaseous component is largely separated from the waste gas and,
   at least one jet pump generating a second pressure used for largely removing the gaseous component from the adsorption separator, wherein the second pressure is lower than the first pressure, wherein the at least one jet pump is fed a stream of a propellant gas at a third pressure, which is higher than the second pressure,
   wherein either a top gas, an offgas, a surplus gas or a mixture of at least two of these gases is used as the propellant gas,
   wherein either a top gas, an offgas, a surplus gas or a mixture of at least two of these gases is used as the waste gas, and
   wherein the second pressure is detected by a measuring device and fed to a controller, with the aid of a set of rules, and with allowance for a setpoint value, the controller determines a manipulated variable and feeds it to a control element, wherein the stream of propellant gas to the jet pump is changed in such a way that the pressure corresponds as far as possible to the setpoint value.

14. The system according to claim 13, wherein at least one of carbon dioxide and water vapor is separated from the waste gas.

15. The system according to claim 13, wherein an adsorption agent of zeolite, activated silica, silica gel, activated alumina, activated charcoal or a mixture of at least two of these substances is used in the adsorption separator.

16. The system according to claim 13, wherein the propellant gas is fed to the jet pump at a pressure of 0.5 to 5 bar above ambient pressure.

17. The system according to claim 13, wherein the propellant gas is fed to a number of jet pumps, set up in a series arrangement, whereby the gaseous component is removed from the adsorption separator at a reduced second pressure.

18. The system according to claim 13, wherein the propellant gas is fed to a number of jet pumps set up in a parallel arrangement, whereby the gaseous component is removed from the adsorption separator at a reduced second pressure.

19. The system according to claim 13, wherein the first pressure is applied to the adsorption separator in an adsorption phase, the pressure in the adsorption separator is lowered from the first pressure to the second pressure, or to a pressure which lies somewhat above the second pressure, with one or more intermediate pressures, the second pressure is applied to the adsorption separator in a desorption phase and subsequently the pressure in the adsorption separator is increased from the second pressure to the first pressure with one or more intermediate pressures.

20. The system according to claim 19, wherein the pressure in the adsorption separator is changed continuously or discretely.

* * * * *